United States Patent
Watabe et al.

(10) Patent No.: US 7,227,458 B2
(45) Date of Patent: Jun. 5, 2007

(54) TIRE INFLATION PRESSURE SENSING APPARATUS WITH HIGH RELIABILITY AND POWER-SAVING CAPABILITY

(75) Inventors: Nobuya Watabe, Nagoya (JP); Ryozo Okumura, Kariya (JP)

(73) Assignee: Denso Corporation, Kariya (JP)

(*) Notice: Subject to any disclaimer, the term of this patent is extended or adjusted under 35 U.S.C. 154(b) by 213 days.

(21) Appl. No.: 11/119,700

(22) Filed: May 3, 2005

(65) Prior Publication Data

US 2005/0248446 A1  Nov. 10, 2005

(30) Foreign Application Priority Data

May 7, 2004 (JP) .............................. 2004-138678

(51) Int. Cl.
*B60C 23/00* (2006.01)
(52) U.S. Cl. .................. 340/447; 340/442; 340/444; 340/445
(58) Field of Classification Search ........... 340/442, 340/444, 445, 447, 449, 438, 505; 73/146, 73/146.2, 146.3, 146.4; 701/1, 2, 65
See application file for complete search history.

(56) References Cited

U.S. PATENT DOCUMENTS

| | | | |
|---|---|---|---|
| 5,602,524 A | 2/1997 | Mock et al. ................. 340/447 |
| 6,204,758 B1 * | 3/2001 | Wacker et al. ............... 340/444 |
| 6,278,361 B1 * | 8/2001 | Magiawala et al. .......... 340/438 |
| 6,420,966 B2 * | 7/2002 | Sugisawa ..................... 340/442 |
| 6,885,292 B2 * | 4/2005 | Katou .......................... 340/445 |
| 6,983,649 B2 * | 1/2006 | Katou ........................... 73/146 |
| 7,010,968 B2 * | 3/2006 | Stewart et al. ................. 73/146 |
| 2004/0090322 A1 | 5/2004 | Tsujita | |

FOREIGN PATENT DOCUMENTS

JP  A-7-507513  8/1995

\* cited by examiner

*Primary Examiner*—Van T. Trieu
(74) *Attorney, Agent, or Firm*—Posz Law Group, PLC (57) ABSTRACT

A tire inflation pressure sensing apparatus according to the present invention includes a transmitter and a receiver. The transmitter is provided on a wheel of a vehicle and includes a pressure sensor working to sense an inflation pressure of a tire on the wheel and an acceleration sensor working to generate a signal as a function of a component of gravitational acceleration in the sensing direction thereof. The transmitter is configured to determine a position thereof depending on the signal generated by the acceleration sensor and transmit the signal representative of the inflation pressure of the tire toward the receiver when a transmitting request is issued and the determined position thereof falls in a predetermined range. The receiver is provided on the body of the vehicle and is configured to receive the signal transmitted from the transmitter and determine the inflation pressure of the tire depending on the received signal.

14 Claims, 9 Drawing Sheets

TIRE INFLATION PRESSURE SENSING APPARATUS WITH HIGH RELIABILITY AND POWER-SAVING CAPABILITY

CROSS-REFERENCE TO RELATED APPLICATION

This application claims priority from Japanese Patent Application No. 2004-138678, filed on May 7, 2004, the content of which is hereby incorporated by reference into this application.

BACKGROUND OF THE INVENTION

1. Technical Field of the Invention

The present invention relates generally to tire inflation pressure sensing apparatuses or sensors. More particularly, the invention relates to a direct-type tire inflation pressure sensing apparatus that includes a transmitter with a pressure sensor, which is installed to a wheel of a vehicle and configured to transmit a signal representative of an inflation pressure of a tire on the wheel sensed by the pressure sensor, a receiver installed to the body of the vehicle and configured to receive the signal transmitted from the transmitter, and an acceleration sensor employed to determine a position of the transmitter relative to the receiver so as to improve reliability of the sensing apparatus and decrease power consumption of the same.

2. Description of the Related Art

Conventional tire inflation pressure sensing apparatuses of direct-type generally include a transmitter and a receiver. (For example, Japanese Patent No. 3212311, an English equivalent of which is U.S. Pat. No. 5,602,524, discloses such an apparatus.)

The transmitter, which includes a pressure sensor, is directly installed to a wheel of a vehicle on which a tire is mounted. The transmitter is configured to transmit a signal representative of an inflation pressure of the tire sensed by the pressure sensor.

The receiver, which includes an antenna, is installed to the body of the vehicle. The receiver is configured to receive the signal transmitted from the transmitter through the antenna and determine the inflation pressure of the tire depending on the received signal.

Figure 11:
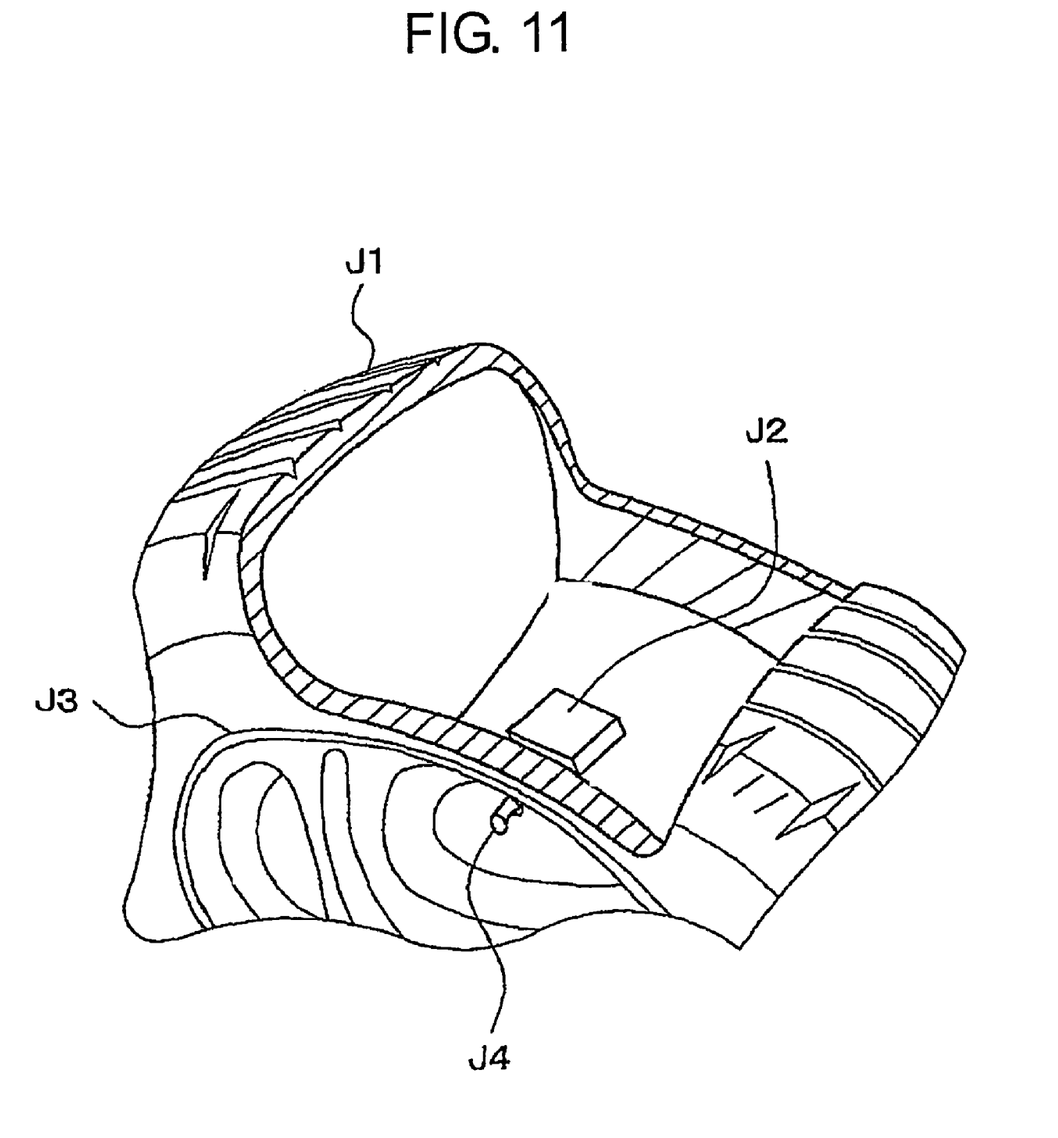
FIG. 11 is a schematic respective view showing installation of a transmitter of a tire inflation pressure sensing apparatus to a wheel of a vehicle.

Specifically, with reference to FIG. 11, the transmitter J2 is placed inside the tire J1 and mounted to an air valve J4 of the wheel J3. Consequently, when the vehicle is running, the position of the transmitter J2 relative to the antenna of the receiver varies due to rotation of the transmitter J2 with the tire J1, thus resulting in variation in the level of the signal received by the receiver.

There may exist such a position of the transmitter J2 relative to the antenna of the receiver that the level of the signal received by the receiver is lower than a required level. When the transmitter J2 is rotated to such a position and transmits at the position the signal representative of the inflation pressure of the tire J1, the receiver cannot accurately recognize the signal, thus resulting in a decrease in the fidelity of the receiver.

To avoid such a decrease in the fidelity of the receiver, one may consider applying one of the following two approaches.

The first approach is to determine a suitable installation position of the antenna of the receiver on the body of the vehicle such that the receiver can accurately recognize the signal transmitted by the transmitter J2 at any rotational position of the transmitter J2.

However, determination of such an installation position of the antenna requires an additional task of evaluating the level of the signal received by the receiver.

Moreover, since the signal transmitted from the transmitter J2 will be attenuated during the course of transmission to the receiver, it is, indeed, very difficult to determine such an installation position of the antenna. For example, when the transmitter J2 transmits the signal at a position where the transmitter J2 is opposed to the receiver with the wheel J3 positioned therebetween, the signal cannot pass through the wheel J3 which is made of a metal material. Especially, when the level of the signal transmitted by the transmitter J2 is restricted under regulations, determination of such an installation position of the antenna becomes more difficult.

Furthermore, in the case where the receiver has only a single antenna, through which the receiver receives all the signals transmitted from a plurality of transmitters J2 installed to different wheels J3 of the vehicle, it is required to install the antenna at an optimal position where the receiver can accurately recognize all the signals transmitted from different transmitters J2. However, determination of the optimal position is even more difficult, and a lot of time is required to evaluate the level of all the signals received by the receiver.

The second approach is to allow the transmitter J2 to continuously transmit a plurality of frames, which contain therein the same signal representative of an inflation pressure of the tire, so as to increase the probability of accurate recognition of the signal by the receiver.

However, this approach still cannot certainly ensure the accurate recognition of the signal by the receiver.

Moreover, since a plurality of frames are transmitted for transmission of the same signal, the electrical power consumed by the transmitter J2 is increased. As a result, when the transmitter J2 is supplied with electrical power by a battery, the life of the battery will be shortened.

SUMMARY OF THE INVENTION

The present invention has been made in view of the above-mentioned problem.

It is, therefore, the first object of the present invention to provide a tire inflation pressure sensing apparatus that ensures accurate recognition of a signal transmitted from a transmitter of the sensing apparatus by a receiver of the same regardless of rotation of the transmitter.

It is the second object of the present invention to ensure that the receiver of the tire inflation pressure sensing apparatus can accurately recognize the signal transmitted from the transmitter of the same without evaluation of the level of the signal received by the receiver for determining a suitable installation position of the receiver.

It is the third object of the present invention to ensure that the receiver of the tire inflation pressure sensing apparatus can accurately recognize the signal transmitted from the transmitter of the same through transmission of only a single frame that contains the signal.

According to one aspect of the present invention, a tire inflation pressure sensing apparatus is provided which includes:

a transmitter provided on a wheel of a vehicle, the transmitter including a pressure sensor that works to sense an inflation pressure of a tire mounted on the wheel and being configured to transmit a signal representative of the inflation pressure of the tire sensed by the pressure sensor; and a receiver provided on a body of the vehicle, the receiver including an antenna and being configured to receive the signal transmitted from the transmitter through the antenna and determine the inflation pressure of the tire depending on the received signal, wherein the transmitter further includes an acceleration sensor that works to generate a signal as a function of a component of gravitational acceleration in a sensing direction of the acceleration sensor, the component of gravitational acceleration varying with rotation of the wheel, and wherein the transmitter is configured to determine a position of the transmitter relative to the antenna of the receiver depending on the signal generated by the acceleration sensor and transmit the signal representative of the inflation pressure of the tire toward the antenna of the receiver when a transmitting request is issued and the determined position of the transmitter falls in a predetermined range.

With such an arrangement, the receiver can accurately recognize the signal transmitted from the transmitter through the antenna of the receiver regardless of rotation of the wheel, thus ensuring reliability and accuracy of the tire inflation pressure sensing apparatus.

Moreover, the receiver can accurately recognize the signal transmitted from the transmitter through the antenna of the receiver without evaluation of the level of the signal received by the receiver for determining a suitable installation position of the receiver on the vehicle body.

Furthermore, the receiver can accurately recognize the signal transmitted from the transmitter through the antenna of the receiver without transmission of more than one frame that contain the same signal, thus saving the electrical power consumed by the transmitter.

In the tire inflation pressure sensing apparatus according to the invention, the acceleration sensor of the transmitter may be arranged on the wheel of the vehicle such that the sensing direction of the acceleration sensor coincides with a radial direction of the wheel.

Further, in the above arrangement, the transmitter may be configured to cancel a DC offset, which represents a centrifugal acceleration that is generated due to rotation of the wheel and acts on the acceleration sensor in the sensing direction thereof, from the signal generated by the acceleration sensor so as to determine the position of the transmitter depending on the resultant AC signal that represents only the component of gravitational acceleration in the sensing direction of the acceleration sensor.

Otherwise, the acceleration sensor of the transmitter may be arranged on the wheel of the vehicle such that the sensing direction of the acceleration sensor coincides with a circumferential direction of the wheel.

With this arrangement, since no centrifugal acceleration acts on the acceleration sensor in the sensing direction thereof, the position of the transmitter can be determined depending directly on the signal generated by the acceleration sensor, without the process of canceling a DC offset from the signal.

Moreover, since only the component of gravitational acceleration acts on the acceleration sensor in the sensing direction thereof, the sensing range of the acceleration sensor can be made small, thus improving accuracy in determination of the position of the transmitter.

In the tire inflation pressure sensing apparatus according to the invention, the transmitter is configured to store the signal representative of the inflation pressure of the tire in a frame that consists of a plurality of packets and transmit those packets separately toward the antenna of the receiver at different times when the determined position of the transmitter falls in the predetermined range.

With such a configuration, since the time required to transmit each packet can be made short, the transmitter can complete the transmission of each packet before it passes over the predetermined range. As a result, the receiver can accurately recognize the signal contained in the frame upon receiving all the packets of the frame that are separately transmitted from the transmitter.

The tire inflation pressure sensing apparatus according to the invention is particularly suitable for the case where the transmitter thereof is supplied with electrical power through a radio wave transmitted from an electrical power charging antenna provided on the body of the vehicle.

In the above case, the electrical power available for the transmitter is considerably smaller than in the case where the transmitter is supplied with electrical power by a battery. Consequently, the level of the signal transmitted by the transmitter becomes considerably lower than that in the latter case. As a result, it becomes further difficult for the receiver to accurately recognize the signal transmitted from the transmitter.

However, for the receiver of the tire inflation pressure sensing apparatus according to the invention, it is still possible to accurately recognize the signal transmitted from the transmitter, since the transmitter transmits the signal only when the position thereof falls in the predetermined range.

Moreover, the antenna of the receiver and the electrical power charging antenna may be configured with a single antenna, through which both functions of supplying electrical power to the transmitter and transmitting the signal representative of the inflation pressure of the tire from the transmitter to the receiver can be implemented, thereby saving the manufacturing cost of the vehicle and increasing the space available for installation of other devices on the body of the vehicle.

According to another aspect of the present invention, a tire inflation pressure sensing apparatus is provided which includes:

a plurality of transmitters each of which is provided on one of a plurality of wheels of a vehicle, the transmitters each including a pressure sensor that works to sense an inflation pressure of a tire mounted on a corresponding one of the wheels and being configured to transmit a signal representative of the inflation pressure of the tire sensed by the pressure sensor; and a receiver provided on a body of the vehicle, the receiver including a single antenna and being configured to receive the signals transmitted from the transmitters through the antenna and determine inflation pressures of the tires depending on the received signals, wherein each of the transmitters further includes an acceleration sensor that works to generate a signal as a function of a component of gravitational acceleration in a sensing direction of the acceleration sensor, the component of gravitational acceleration varying with rotation of the corresponding one of the wheels, and wherein each of the transmitters is configured to determine a position thereof relative to the antenna of the receiver depending on the signal generated by the acceleration sensor and transmit the signal representative of the inflation pressure of the tire toward the antenna of the receiver when a transmitting request is issued and the determined position thereof falls in a predetermined range.

With the above arrangement, the determination of a suitable installation position of the antenna on the body of the vehicle becomes easy and evaluation of the level of the signals received by the receiver can be made in short time.

BRIEF DESCRIPTION OF THE DRAWINGS

The present invention will be understood more fully from the detailed description given hereinafter and from the accompanying drawings of the preferred embodiments of the invention, which, however, should not be taken to limit the invention to the specific embodiments but are for the purpose of explanation and understanding only.

In the accompanying drawings.

DESCRIPTION OF THE PREFERRED EMBODIMENTS

The preferred embodiments of the present invention will be described hereinafter with reference to FIGS. 1–10.

It should be noted that, for the sake of clarity and understanding, identical components having identical functions in different embodiments of the invention have been marked, where possible, with the same reference numerals in each of the figures.

[First Embodiment]

Figure 1:
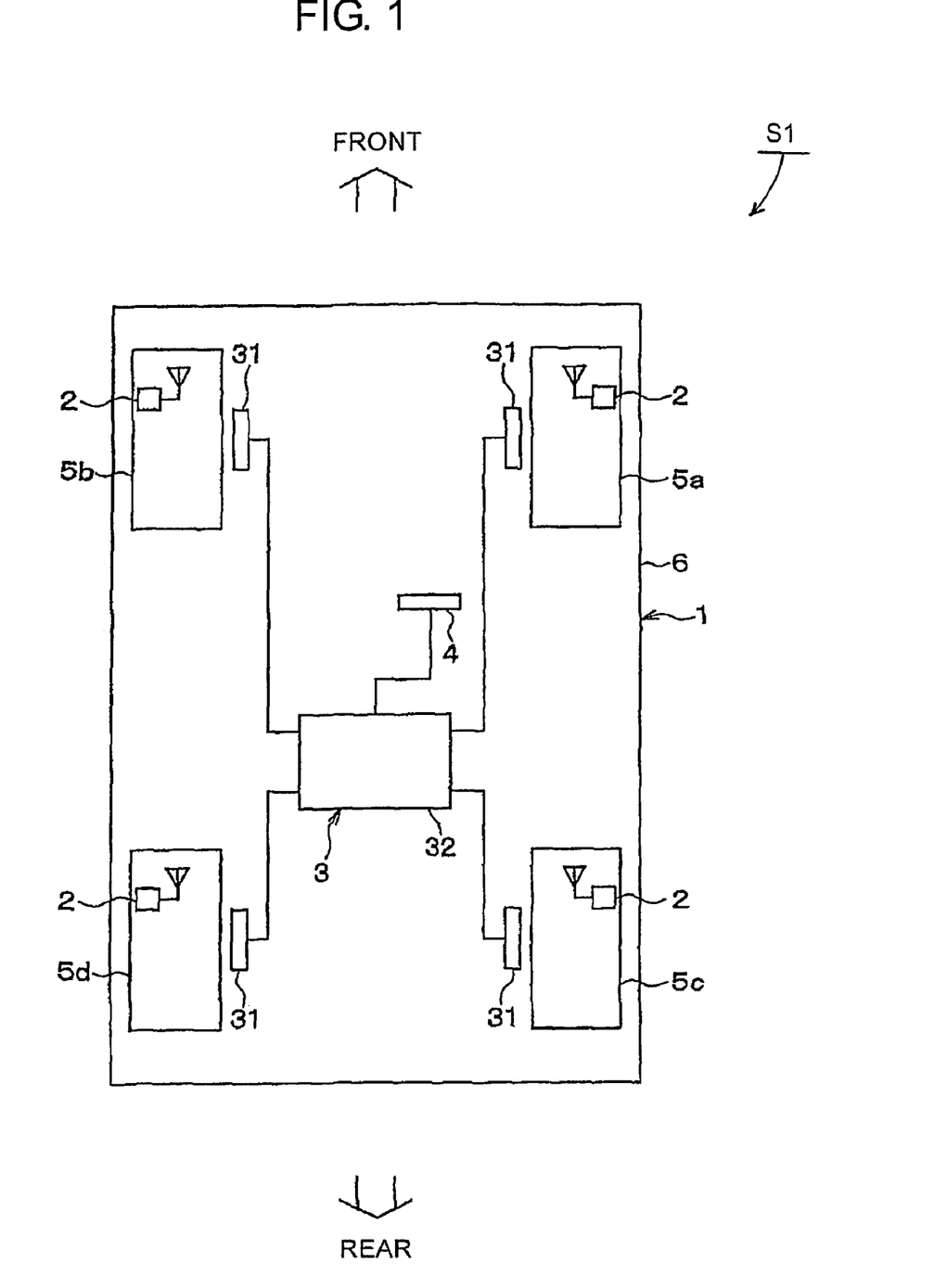
FIG. 1 is a schematic diagram showing an overall configuration of a tire inflation pressure sensing apparatus according to the first embodiment of the invention.

FIG. 1 shows the overall configuration of a tire inflation pressure sensing apparatus S1 according the first embodiment of the invention.

The tire inflation pressure sensing apparatus S1 is installed to a vehicle 1; it is configured to sense inflation pressures of four tires each of which is mounted on one of four wheels 5a–5d of the vehicle 1 (i.e., the front-right wheel 5a, the front-left wheel 5b, the rear-right wheel 5c, and the rear-left wheel 5d).

As shown in FIG. 1, the tire inflation pressure sensing apparatus S1 includes four transmitters 2, each of which is installed to one of the four wheels 5a–5d, a receiver 3 installed to the body 6 of the vehicle 1, and a warning device 4 electrically connected to the receiver 3.

Each transmitter 2 is configured to sense an inflation pressure of a corresponding one of the four tires and transmit a frame that contains a signal representative of the sensed inflation pressure of the tire.

Figure 2A:
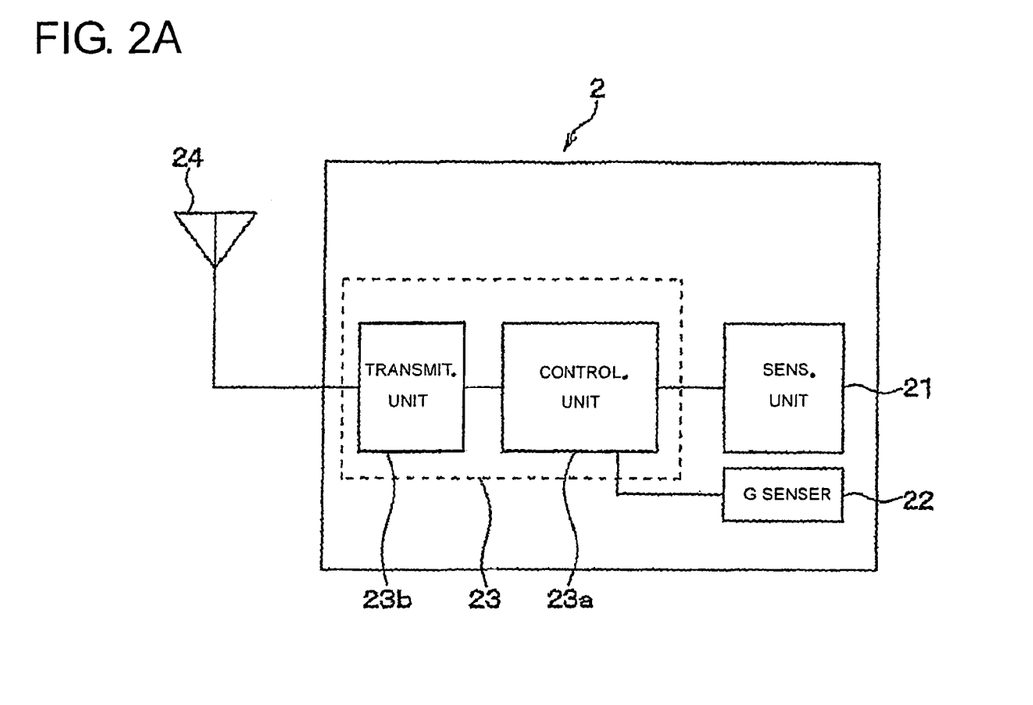
FIG. 2A is a block diagram showing an overall configuration of a transmitter of the tire inflation pressure sensing apparatus of FIG. 1.

Referring to FIG. 2A, each transmitter 2 includes a sensing unit 21, an acceleration sensor or G sensor 22, a microcomputer 23, and an antenna 24.

The sensing unit 21 is configured with sensors, such as a diaphragm-type pressure sensor and a temperature sensor, and works to output signals representative of the sensed inflation pressure of the tire and the temperature of air in the tire.

The acceleration sensor 22 may be of a well-known type, such as the diaphragm-type and capacitive-type. The acceleration sensor 22 is configured to sense an acceleration and output a signal representative of the sensed acceleration to the microcomputer 23.

The microcomputer 23 is configured with a CPU (Central Processing Unit), a ROM (READ Only Memory), a RAM (Random Access Memory), and I/O (Input/output) devices.

The microcomputer 23 functionally includes a controlling unit 23a and a transmitting unit 23b, which are realized by a program installed in the ROM when the program is activated. The two units 23a and 23b are configured to implement predetermined processes in accordance with the program.

Specifically, the controlling unit 23a receives signals outputted from the sensing unit 21 and processes those signals. Then, the controlling unit 23a stores in a frame those signals together with an ID signal that is indicative of which one of the four transmitters 2 transmits those signals.

The transmitting unit 23b determines a transmitting time, which is to be described below in detail, and transmits the frame toward the receiver 3 at the determined transmitting time through the antenna 24.

As described previously, each transmitter 2 is mounted to an air valve of the wheel and at least the sensing unit 21 thereof is placed inside the tire so as to be exposed to the air in the tire.

Figure 2B:
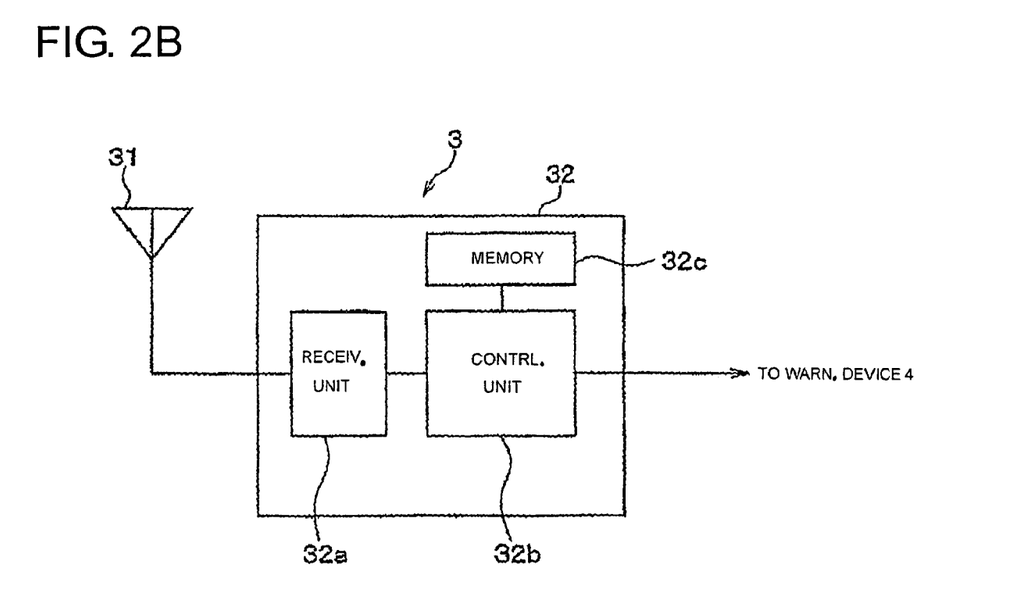
FIG. 2B is a block diagram showing an overall configuration of a receiver of the tire inflation pressure sensing apparatus of FIG. 1.

The receiver 3 is configured to receive frames, each of which is transmitted from one of the four transmitters 2, and determine the inflation pressures of the four tires based on the signals contained in those frames.

Referring to FIG. 2B, the receiver 3 includes at least one antenna 31 and a microcomputer 32.

In this embodiment, four antennas 31 are employed as shown in FIG. 1. Each antenna 31 is provided at a position on the body 6 of the vehicle 1 corresponding to one of the four transmitters 2. For example, each antenna 31 is positioned away from the corresponding transmitter 2 by a given distance and fixed to the body 6 of the vehicle.

The microcomputer 32 is configured with a CPU, a nonvolatile EEPROM (Electronically Erasable and Programmable Read Only Memory), a RAM, and I/O devices.

The microcomputer 32 functionally includes a receiving unit 32a, a controlling unit 32b, and a memory 32c, which are realized by a program installed in the EEPROM of the microcomputer 32 when the program is activated. The two units 32a and 32b are configured to implement predetermined processes in accordance with the program.

Specifically, the receiving unit 32a receives frames transmitted from the transmitters 2 through the respective antennas 31 and provides those frames to the controlling unit 32b.

The controlling unit 32b analyzes each of the ID signals contained in those frames provided by the receiving unit 32a and identifies the corresponding one of the four transmitters 2 (i.e., the corresponding one of the four tires).

Then, the controlling unit 32b determines each of the inflation pressures of the four tires through performing signal processing and calculations based on the signals contained in the corresponding one of those frames.

After that, the controlling unit 32b compares each of the determined inflation pressures of the four tires with a predefined threshold value and outputs a warning signal to the warning device 4 when it is lower than the predefined threshold value.

The memory 32c is provided for storage of data including intermediate calculation results from the controlling unit 32b and the determined values of inflation pressures of the tires.

The warning device 4 is arranged, as shown in FIG. 1, in a place that is visible for the driver of the vehicle 1. The warning device 4 may be configured with at least one of a warning lamp, a warning display, both of which may be disposed in the instrument panel of the vehicle 1, and a warning buzzer. The warning device 4 informs a decrease in the inflation pressure of a tire to the driver upon receiving a warning signal outputted from the controlling unit 32b.

Having described the overall configuration of the tire inflation pressure sensing apparatus S1, operation thereof will be described hereinafter.

According to the present invention, in each transmitter 2, the controlling unit 23a receives the signal representative of an acceleration outputted from the acceleration sensor 22 in addition to the signals representative of the inflation pressure of the tire and the temperature of air in the tire outputted from the sensing unit 21.

Figure 3:
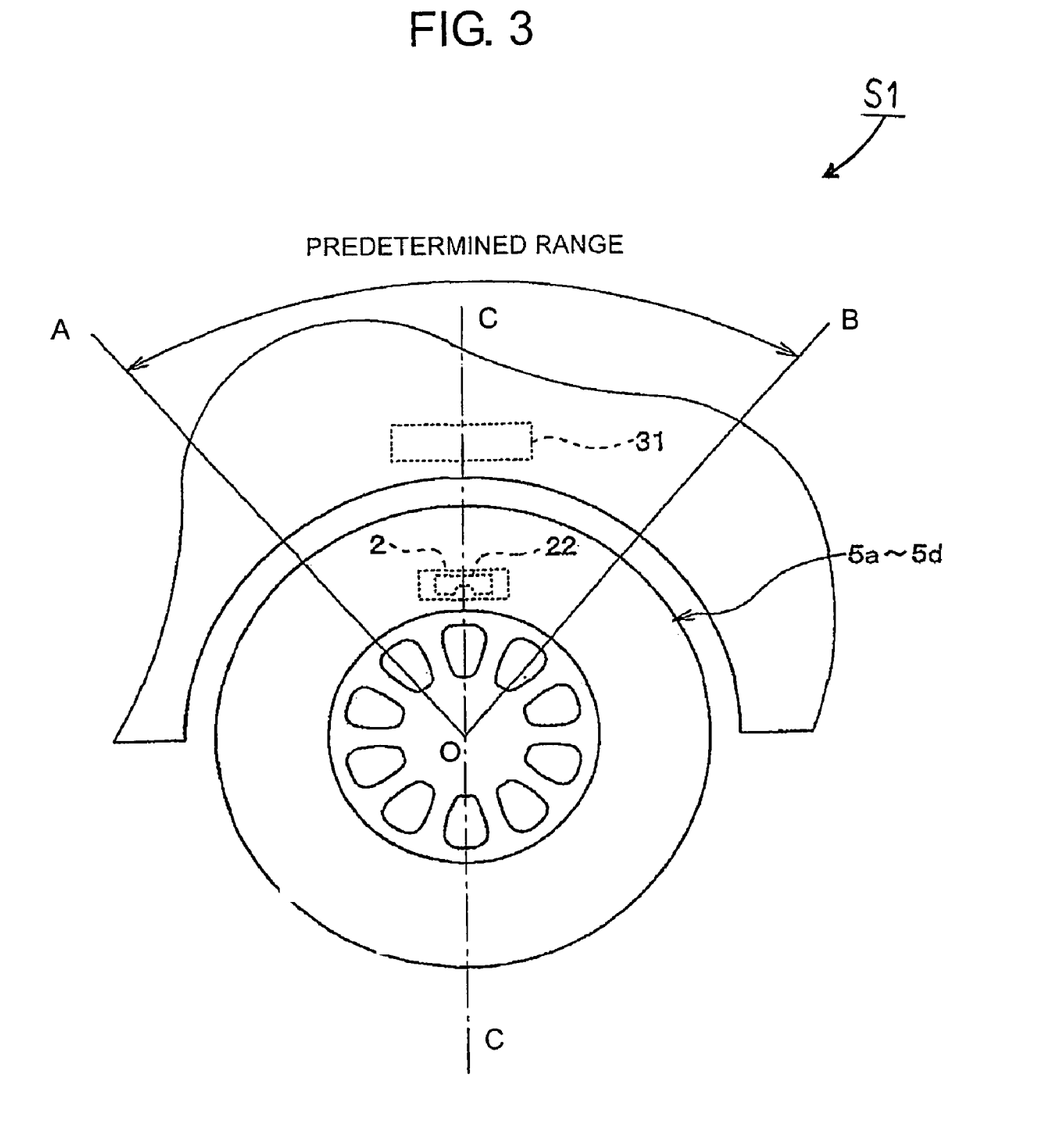
FIG. 3 is a schematic view showing an arrangement of an acceleration sensor of the tire inflation pressure sensing apparatus of FIG. 1 on the body of a vehicle.

In this embodiment, as shown in FIG. 3, the acceleration sensor 22 is arranged on the wheel such that the sensing direction of the acceleration sensor 22 coincides with a radial direction of the wheel.

With such an arrangement, the component of gravitational acceleration in the sensing direction of the acceleration sensor 22 varies with rotation of the wheel. Accordingly, the signal representative of the acceleration sensed by the acceleration sensor 22 also varies with rotation of the wheel.

Figure 4:
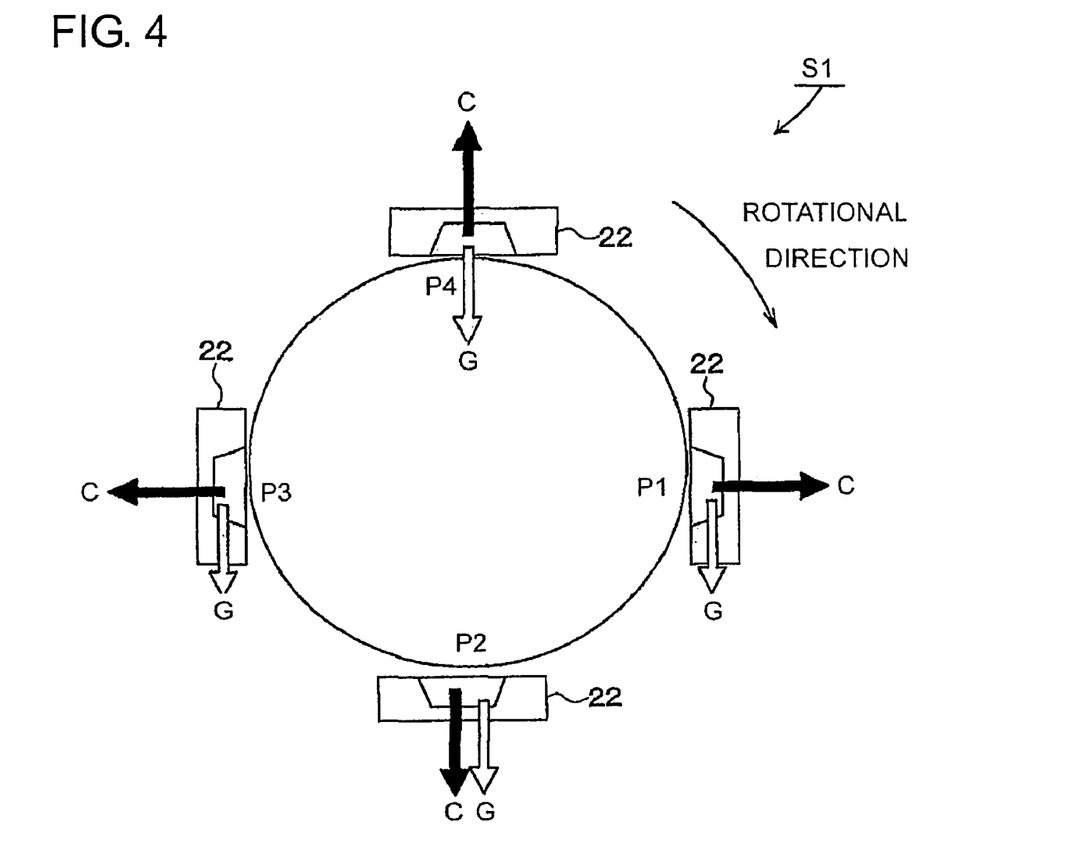
FIG. 4 is a schematic view illustrating variation of the component of gravitational force in the sensing direction of the acceleration sensor of FIG. 3 with rotation thereof.
Figure 5:
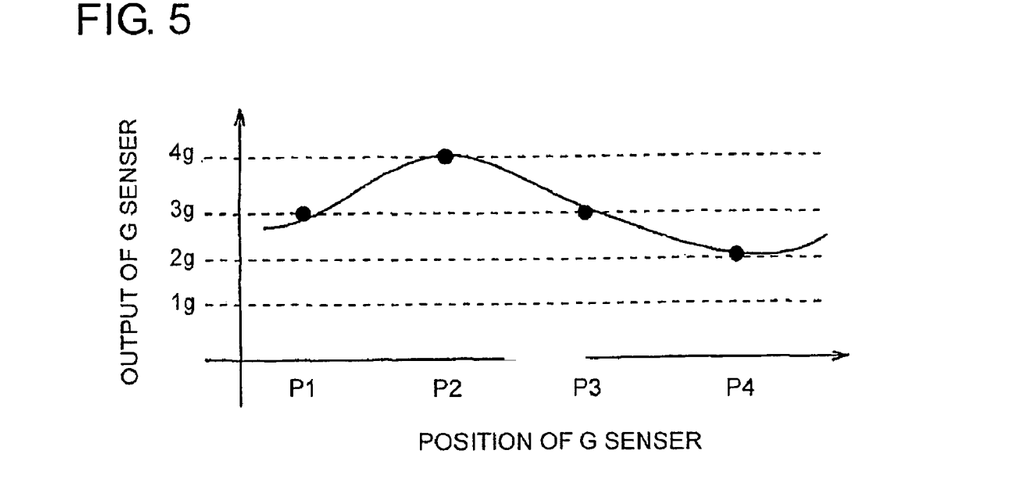
FIG. 5 is a waveform chart illustrating a signal generated by the acceleration sensor of FIG. 3 with rotation thereof.

With regard to the above feature, FIG. 4 illustrates the relation between the component of gravitational acceleration in the sensing direction of the acceleration sensor 22 and rotation of the wheel, while FIG. 5 shows the waveform of the signal outputted by the acceleration sensor 22.

At all the positions P1–P4 of the acceleration sensor 22 shown in FIG. 4, the acceleration sensor 22 receives the gravitational force G and a certain amount of centrifugal force C that is dependant on the rotational speed of the wheel.

As shown in FIG. 4, the application direction of the centrifugal force C always coincides with the sensing direction of the acceleration sensor 22. Accordingly, a certain amount of centrifugal acceleration acts in the sensing direction of the acceleration sensor 22 regardless of rotation of the acceleration sensor 22. In contrast, the relation between the application direction of the gravitational force G and the sensing direction of the acceleration sensor 22 varies with rotation of the acceleration sensor 22, so that the component of gravitational acceleration in the sensing direction of the acceleration sensor 22 also varies accordingly.

Specifically, at the position P1, which is an intermediate position of the acceleration sensor 22 during rotation thereof, the application direction of the gravitational force G is perpendicular to the sensing direction of the acceleration sensor 22.

As a consequence, the acceleration sensor 22 senses only the centrifugal acceleration. When supposing that the centrifugal acceleration has a magnitude of 3 g (here, g denotes the magnitude of the gravitational acceleration), then in FIG. 5, the value of acceleration sensed by the acceleration sensor 22 is equal to 3 g at the position P1.

At the position P2, which is the lowest position of the acceleration sensor 22 during rotation thereof, the application direction of the gravitational force G coincides with the sensing direction of the acceleration sensor 22. Accordingly, the acceleration sensor 22 senses both the gravitational acceleration and centrifugal acceleration, and in FIG. 5, the value of acceleration sensed by the acceleration sensor 22 becomes equal to 4 g.

At the position P3, which is the other intermediate position of acceleration sensor 22 during rotation thereof, the application direction of the gravitational force G is perpendicular to the sensing direction of the acceleration sensor 22. Accordingly, the acceleration sensor 22 senses only the centrifugal acceleration, and in FIG. 5, the value of acceleration sensed by the acceleration sensor 22 becomes equal to 3 g.

At the position P4, which is the highest position of the acceleration sensor 22 during rotation thereof, the application direction of the gravitational force G is parallel, but opposite to the sensing direction of the acceleration sensor 22. Accordingly, the acceleration sensor 22 senses both the gravitational acceleration and centrifugal acceleration, but in FIG. 5, the value of acceleration sensed by the acceleration sensor 22 becomes equal to 2 g.

Accordingly, with the above arrangement, the position of the transmitter 2 that includes the acceleration sensor 22 can be determined depending on the signal representative of the acceleration sensed by the acceleration sensor 22.

Further, the centrifugal acceleration acting in the sensing direction of the acceleration sensor 22 has a constant value regardless of rotation of the transmitter 2. Therefore, a DC offset, which is representative of the centrifugal acceleration, can be canceled from the signal generated by the acceleration sensor 22, so that determination of the position of the transmitter 2 can be made depending on the resultant AC signal that represents only the component of gravitational acceleration in the sensing direction of the acceleration sensor 22.

Specifically, the controlling unit 23a performs, in accordance with the program installed in the ROM, the process of canceling the DC offset from the signal generated by the acceleration sensor 22 and then determines the position of the transmitter 2 depending on the resultant AC signal.

In addition, although the acceleration sensed by the acceleration sensor 22 has the same value of 3 g at the positions P1 and P3 in FIG. 5, it is still possible to make a distinction between the two positions P1 and P3 depending on the inclination values of the signal at those positions. Specifically, the inclination of the signal has a positive value at the position P1, whereas it has a negative value at the position P3.

After determination of the position of the transmitter 2, the controlling unit 23a makes a decision about whether or not to transmit the frame, in which signals generated by the sensing unit 21 is contained, toward the corresponding antenna 31 of the receiver 3.

Specifically, the decision is made through checking whether both the following two conditions are satisfied.

The first condition is that the time period from the previous transmitting time to the present moment is longer than a given time period, for example, of 1 minute. When this condition is satisfied, the controlling unit 23a recognizes that it is time to start new transmission, in other words, a new transmitting request is issued.

The second condition is that the presently determined position of the transmitter 2 falls in a predetermined range. The predetermined range is so determined that when the transmitter 2 transmits a frame within the range, the receiver 3 can accurately recognize all the signals contained in the frame.

For example, referring back to FIG. 3, the antenna 31 of the receiver 3 is installed to the fender of the vehicle body 6 such that a vertical centerline C—C of the wheel passes through the antenna 31. In this case, the predetermined range is defined as the angular range A-O-B, for example, of 100°, which spreads out from the shaft of the wheel and is symmetrical with respect to the vertical centerline C—C.

When both the above conditions are satisfied, the controlling unit 23a determines the present time as a new transmitting time and transmits the frame toward the antenna 31 of the receiver 3. Then, the newly determined transmitting time is recorded for determination of the next transmitting time.

The receiving unit 32a of the receiver 3 receives the frame transmitted from the transmitter 2 through the antenna 31 and provides the frame to the controlling unit 32b. Then, based on all the signals contained in the frame, the controlling circuit 32b identifies the transmitter 2 and determines the inflation pressure of the tire and the temperature of air in the tire. When the determined air temperature falls out of a given range, the controlling unit 32b conducts temperature-compensation for the determined inflation pressure. After that, the controlling unit 23 compares the inflation pressure with the predefined threshold value and outputs a warning signal to the warning device 4 when it is lower than the predefined threshold value. The warning device 4 informs the decrease in the inflation pressure of the tire to the driver of the vehicle 1 upon receiving the warning signal from the controlling unit 32b.

To sum up, the tire inflation pressure sensing apparatus S1 according to the present embodiment includes four transmitters 2, each of which is installed to one of the four wheels of the vehicle 1, and a receiver 3 installed to the body 6 of the vehicle 1.

Each transmitter 2 includes a sensing unit 21, which works to sense an inflation pressure of a tire mounted on a corresponding one of the wheels, and is configured to transmit a frame in which a signal representative of the inflation pressure of the tire sensed by the sensing unit 21 is contained.

The receiver 3 includes four antennas 31, each of which corresponds to one of the four transmitters 2, and is configured to receive the frames transmitted from the transmitters 2 through the respective antennas 31 and determine the inflation pressures of the four tires depending on the received frames.

The tire inflation pressure sensing apparatus S1 is characterized in that:

each transmitter 2 further includes an acceleration sensor 22 that works to generate a signal as a function of the component of gravitational acceleration in the sensing direction of the acceleration sensor 22; and each transmitter 2 is configured to determine a position thereof relative to the corresponding one of the antennas 31 of the receiver 3 depending on the signal generated by the acceleration sensor 22 and transmit the frame toward the corresponding antenna 31 when a transmitting request is issued and the determined position thereof falls in a predetermined range.

With the above arrangement, the receiver 3 can accurately recognize the signals transmitted from the transmitters 2 through respective antennas 31 regardless of rotation of the wheels, thus ensuring reliability and accuracy of the tire inflation pressure sensing apparatus S1.

Moreover, the receiver 3 can accurately recognize the signals transmitted from the transmitters 2 through respective antennas 31 without evaluation of the level of the received signals for determining a suitable installation position of the receiver 3 on the vehicle body 6.

Furthermore, the receiver 3 can accurately recognize the signals transmitted from the transmitters 2 through respective antennas 31 without transmission of more than one frame that contain the same signals, thus saving the electrical power consumed by the transmitters 2.

Additionally, the tire inflation pressure sensing apparatus S1 is particularly suitable for the case where each transmitter 2 thereof is supplied with electrical power through a radio wave transmitted from an electrical power charging system provided on the vehicle body 6 without any battery.

Figure 6A:
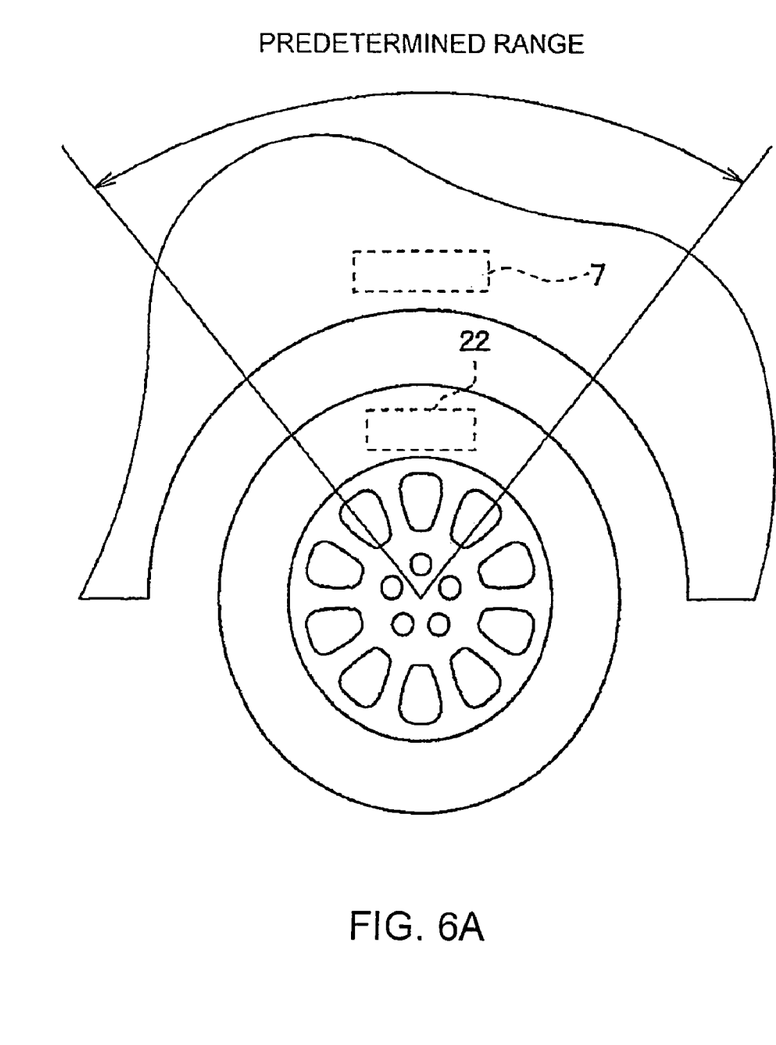
FIGS. 6A–6B are schematic views showing an arrangement of an electrical power charging antenna on the body of a vehicle for supplying electrical power to a transmitter of the tire inflation pressure sensing apparatus of FIG. 1.
Figure 6B:
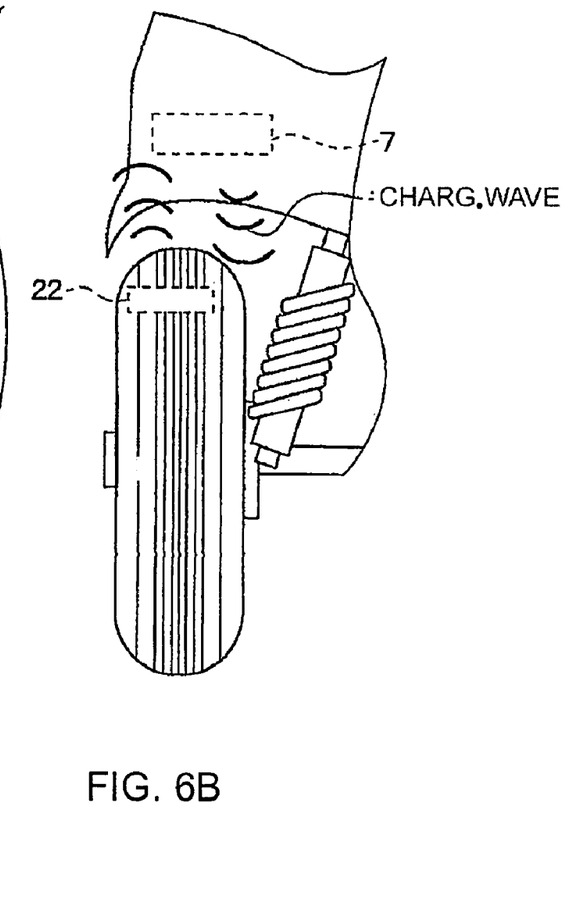

For example, with reference to FIGS. 6A–6B, each transmitter 2 may be supplied with electrical power through a radio wave transmitted from a corresponding one of four electrical power charging antennas 7. Each electrical power charging antenna 7 may be installed to the fender of the vehicle body 6 in proximity to the corresponding antenna 31 of the receiver 3 that is omitted in the FIGS. 6A–6B.

In the above case, the electrical power available for the transmitter 2 is considerably smaller than in the case where the transmitter 2 is supplied with electrical power by a battery. Consequently, the level of the signals transmitted by the transmitter 2 becomes considerably lower than that in the latter case. As a result, it becomes further difficult for the receiver 3 to accurately recognize the signals transmitted from the transmitter 2.

However, for the receiver 3 of the tire inflation pressure sensing apparatus S1 according to the present embodiment, it is still possible to accurately recognize the signals transmitted from the transmitter 2, since the transmitter 2 transmits those signals only when the position thereof falls in the predetermined range.

The use of electrical power charging systems as described above is well known in the art, particularly in the field of wireless ID cards; therefore, more details thereabout is omitted hereinafter.

[Second Embodiment]

In this embodiment, an inflation pressure sensing apparatus S2 is provided which has a structure almost identical to that of the inflation pressure sensing apparatus S1 according to the previous embodiment. Accordingly, only the difference in structure between the two tire inflation pressure sensing apparatuses is to be described below.

As described previously, in the tire inflation pressure sensing apparatus S1, each transmitter 2 includes the acceleration sensor 22 that is arranged on the wheel of the vehicle such that the sensing direction of the acceleration sensor 22 coincides with a radial direction of the wheel.

Figure 7:
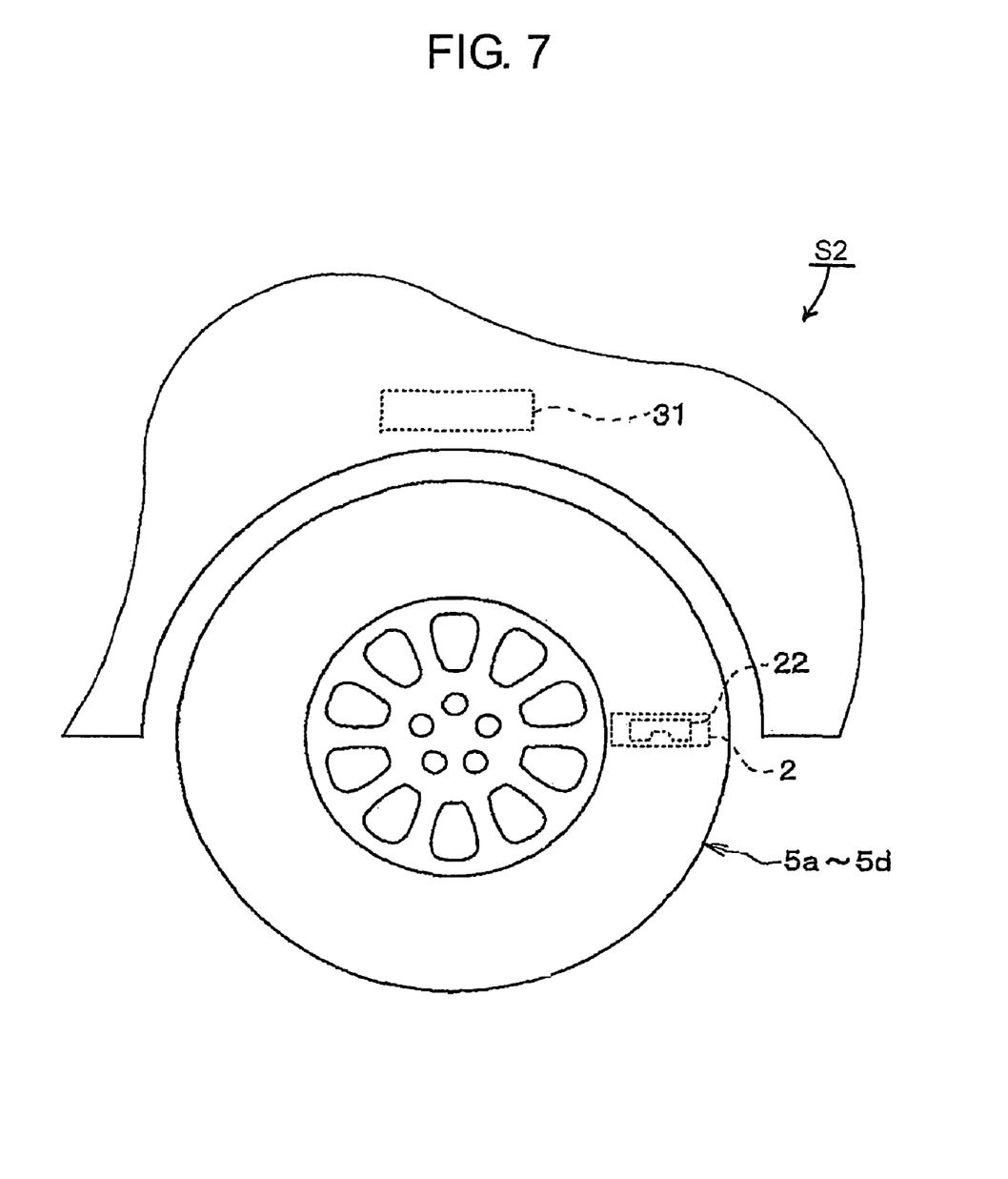
FIG. 7 is a schematic view showing an arrangement of an acceleration sensor of a tire inflation pressure sensing apparatus according to the second embodiment of the invention on the body of a vehicle.

In comparison, in the tire inflation pressure sensing apparatus S2, the acceleration sensor 22 is so arranged, as shown in FIG. 7, on the wheel of the vehicle 1 that the sensing direction of the acceleration sensor 22 coincides with a circumferential direction of the wheel.

With the arrangement of acceleration sensor 22 shown in FIG. 7, the component of gravitational acceleration in the sensing direction of the acceleration sensor 22 varies with rotation of the wheel. Accordingly, the signal representative of the acceleration sensed by the acceleration sensor 22 also varies with rotation of the wheel.

Figure 8:
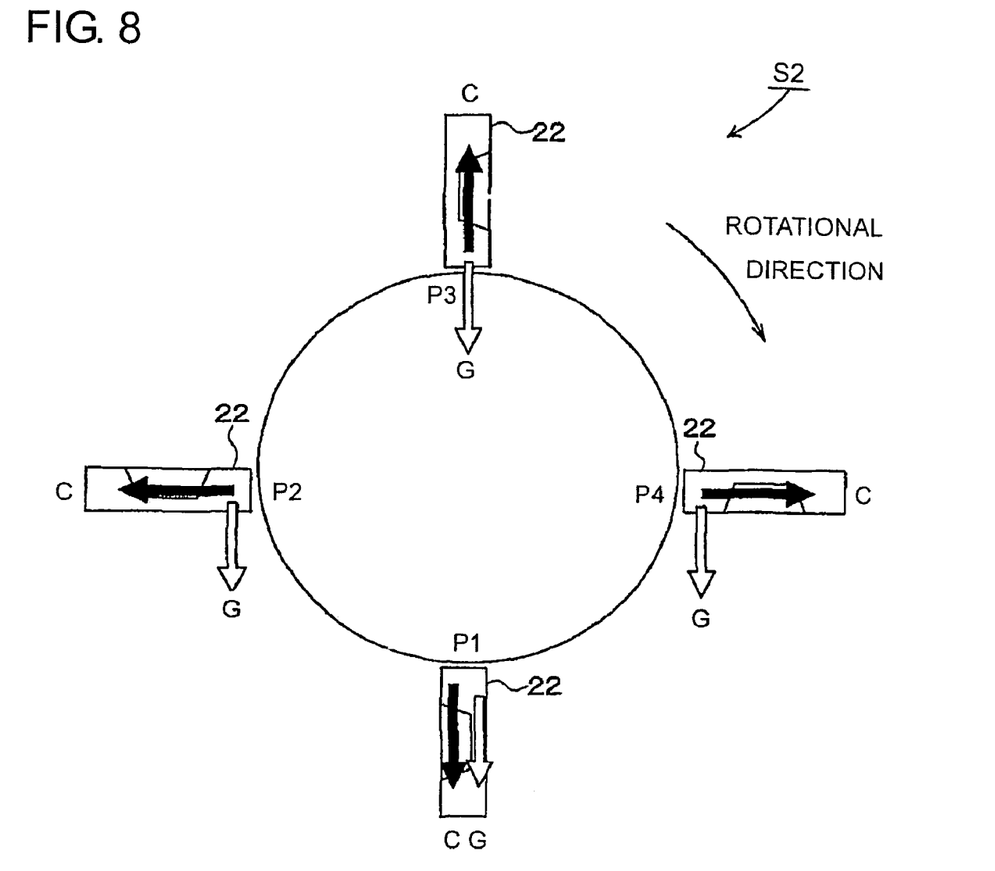
FIG. 8 is a schematic view illustrating variation of the component of gravitational force in the sensing direction of the acceleration sensor of FIG. 7 with rotation thereof.
Figure 9:
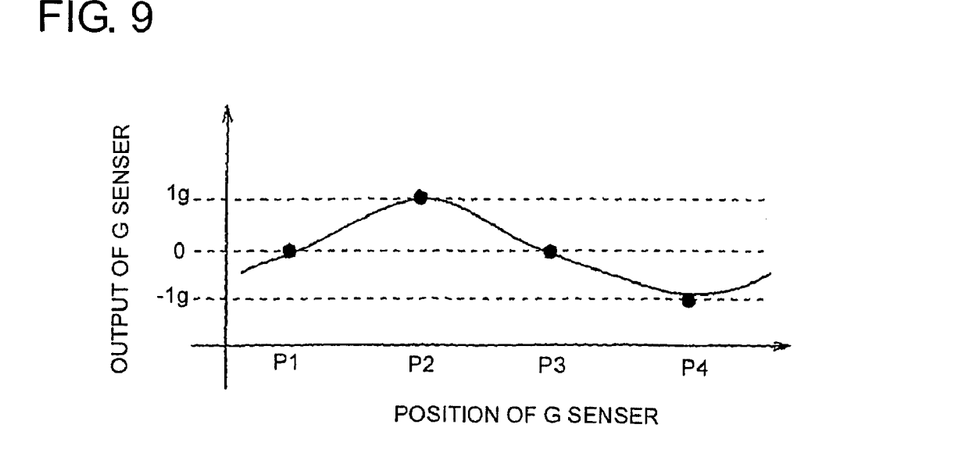
FIG. 9 is a waveform chart illustrating a signal generated by the acceleration sensor of FIG. 7 with rotation thereof.

With regard to the above feature, FIG. 8 illustrates the relation between the component of gravitational acceleration in the sensing direction of the acceleration sensor 22 and rotation of the wheel, while FIG. 9 shows the waveform of the signal outputted by the acceleration sensor 22.

At all the positions P1–P4 of the acceleration sensor 22 shown in FIG. 8, the acceleration sensor 22 receives the gravitational force G and a certain amount of centrifugal force C that is dependant on the rotational speed of the wheel.

However, as shown in FIG. 8, the application direction of the centrifugal force C is always perpendicular to the sensing direction of the acceleration sensor 22. Consequently, no centrifugal acceleration acts in the sensing direction of the acceleration sensor 22 regardless of rotation of the acceleration sensor 22 with the wheel.

Accordingly, the signal outputted by the acceleration sensor 22 represents only the component of gravitational acceleration in the sensing direction of the acceleration sensor 22, which varies with rotation of the acceleration sensor 22 with the wheel.

Specifically, at the position P1, which is the lowest position of the acceleration sensor 22 during rotation thereof, the application direction of the gravitational force G is perpendicular to the sensing direction of the acceleration sensor 22. Consequently, the value of acceleration sensed by the acceleration sensor 22 is equal to zero as shown in FIG. 9.

At the position P2, which is an intermediate position of the acceleration sensor 22 during rotation thereof, the application direction of the gravitational force G coincides with the sensing direction of the acceleration sensor 22. Consequently, the value of acceleration sensed by the acceleration sensor 22 becomes equal to 1 g.

At the position P3, which is the highest position of the acceleration sensor 22 during rotation thereof, the application direction of the gravitational force G is perpendicular to the sensing direction of the acceleration sensor 22. Consequently, the value of acceleration sensed by the acceleration sensor 22 becomes equal to zero.

At the position P4, which is the other intermediate position of acceleration sensor 22 during rotation thereof, the application direction of the gravitational force G is parallel, but opposite to the sensing direction of the acceleration sensor 22. Consequently, the value of acceleration sensed by the acceleration sensor 22 becomes equal to −1 g.

Accordingly, with the arrangement of acceleration sensor 22 according to the present embodiment, it is still possible to determine the position of the transmitter 2 that includes the acceleration sensor 22 depending on the signal outputted by the acceleration sensor 22.

Further, since no centrifugal acceleration acts on the acceleration sensor 22 in the sensing direction thereof, the position of the transmitter 2 can be determined depending directly on the signal outputted by the acceleration sensor 22, without the process of canceling a DC offset as in the previous embodiment.

Furthermore, since only the component of gravitational acceleration acts on the acceleration sensor 22 in the sensing direction thereof, the sensing range of the acceleration sensor 22 can be made smaller than that in the previous embodiment, thus improving accuracy in determination of the position of the transmitter 2.

[Third Embodiment]

In this embodiment, a method of transmitting signals from a transmitter 2 of the tire inflation pressure sensing apparatus S1 or S2 to the receiver 3 of the same is provided, which is different from that described in the previous embodiments.

In the previous embodiments, the controlling unit 23a of the transmitter 2 stores in a frame signals representative of the inflation pressure of the tire and the temperature of air in the tire together with an ID signal. Then, the transmitting unit 23b of the transmitter 2 transmits the frame at once at a determined transmitting time.

However, according to the method of the present embodiment, the transmitter 2 stores the signals together with the ID signal in a frame that consists of a plurality of packets, and then the transmitting unit 23b transmits those packets separately at different determined transmitting times.

Figure 10A:
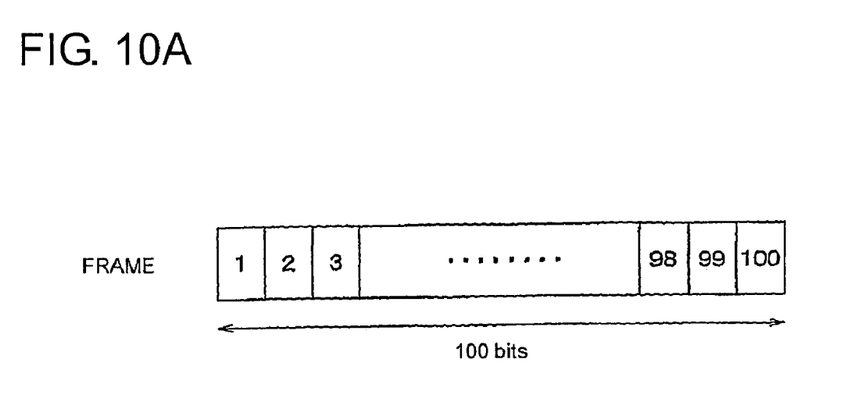
FIG. 10A is a schematic view illustrating a frame transmitted by a transmitter of the tire inflation pressure sensing apparatus of FIG. 1.
Figure 10B:
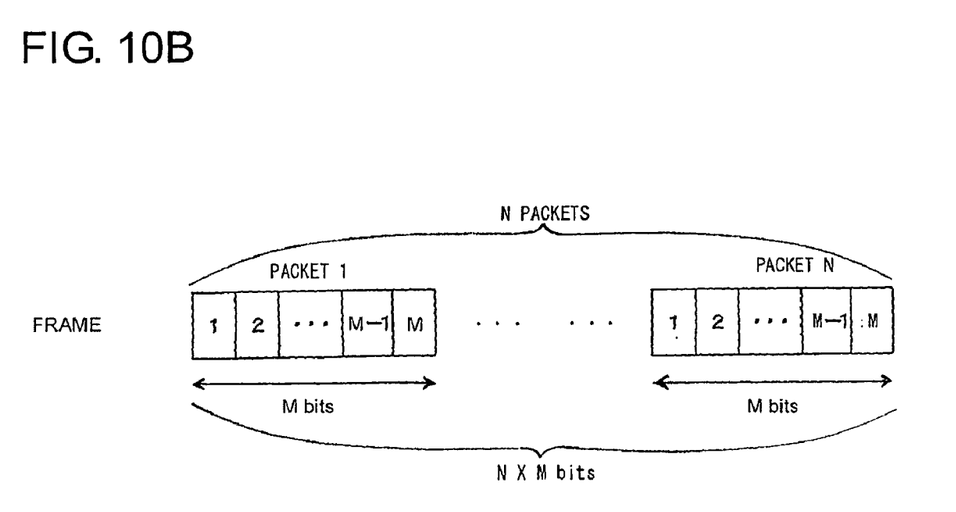
FIG. 10B is a schematic view illustrating a frame that consists of a plurality of packets according to the third embodiment of the invention.

To illustrate the difference between the two transmitting methods, two frames that contain the same information are given in FIGS. 10A–10B.

FIG. 10A shows a frame that is composed, for example, of 100 bits of data. When assuming that the transmitting speed is 10 kbps, the time required to transmit the frame is then equal to 10 ms.

In comparison, FIG. 10B shows a frame that includes N packets each of which is composed of M bits of data. Since each packet includes a parity bit and a bit representative of the number of the packet, the total bits N×M of the frame becomes greater than 100 bits in the case of FIG. 10A.

When assuming that the transmitting speed is also equal to 10 kbps, the time required to transmit the frame is 0.1×M×N, which is longer than 10 ms in the case of FIG. 10A. However, for each packet, the time required to transmit the single packet is only 0.1×M, which is shorter than 10 ms.

The method of the present embodiment can provide the following effect.

As running speed of the vehicle 1 increases, the rotational speed of the wheels 5a–5d also increases. As a result, the time period in which each transmitter 2 passes through the predetermined range may become shorter than 10 ms which is required to transmit the frame in FIG. 10A.

Consequently, when the transmitter 2 transmits the frame at once at a determined transmitting time, the transmitter 2 will pass over the predetermined range before completing the transmission of the frame, so that the receiver cannot accurately recognize all the signals stored in the frame.

In contrast, according to the method of the present embodiment, since the time required to transmit each packet is made short, the transmitter 2 can complete the transmission of each packet before it passes over the predetermined range. As a result, the receiver 3 can accurately recognize all the signals stored in the frame upon receiving all the packets of the frame that are separately transmitted from the transmitter 2.

[Other Embodiments]

While the above particular embodiments of the invention have been shown and described, it will be understood by those who practice the invention and those skilled in the art that various modifications, changes, and improvements may be made to the invention without departing from the spirit of the disclosed concept.

For example, in the previous embodiments of the invention, the receiver 3 includes four antennas 31 each of which corresponds to one of the four transmitters 2 on different wheels of the vehicle 1.

However, the receiver 3 may also be configured to include only a single antenna 31, through which the receiver 3 receives all the frames transmitted from the four transmitters 2.

The use of a single antenna 31 requires determination of a suitable installation position of the antenna 31 on the body 6 of the vehicle 1 such that the receiver 3 can recognize all the signals transmitted from the four transmitters 3.

According to the first conventional approach described previously, it is required to determine such an installation position of the antenna 31 that the receiver 3 can recognize all the signals that are transmitted by the four transmitters 3 at any rotational position thereof. However, such an installation position of the antenna 31 on the vehicle body 6 is very limited, and thus the determination task thereof is very time-consuming.

In contrast, according to the present invention, only such an installation position of the antenna 31 is required that the receiver 3 can recognize all the signals that are transmitted by the four transmitters 3 at only limited rotational positions thereof, i.e., the predetermined ranges of position of those transmitters 2 as described previously. The range of such an installation position of the antenna 31 on the vehicle body 6 is relatively wide, and accordingly the determination task can be completed in short time.

Moreover, in the first embodiment of the invention, the electrical power charging antenna 7 and the antenna 31 of the receiver 3 are described as different antennas that are arranged close to each other.

However, the antennas 7 and 31 may also be configured with a single antenna through which both functions of supplying electrical power to the transmitter 2 and transmitting signals from the transmitter 2 to the receiver 3 can be implemented.

With such a configuration, the manufacturing cost of the vehicle 1 can be saved and the space available for installation of other devices on the body 6 of the vehicle 1 can be increased.

Such modifications, changes, and improvements within the skill of the art are intended to be covered by the appended claims.

What is claimed is:

1. A tire inflation pressure sensing apparatus comprising:
    a transmitter provided on a wheel of a vehicle, said transmitter including a pressure sensor that works to sense an inflation pressure of a tire mounted on the wheel and being configured to transmit a signal representative of the inflation pressure of the tire sensed by the pressure sensor; and
    a receiver provided on a body of the vehicle, said receiver including an antenna and being configured to receive the signal transmitted from said transmitter through the antenna and determine the inflation pressure of the tire depending on the received signal,
    wherein said transmitter further includes an acceleration sensor that works to generate a signal as a function of a component of gravitational acceleration in a sensing direction of the acceleration sensor, the component of gravitational acceleration varying with rotation of the wheel, and
    wherein said transmitter is configured to determine a position of said transmitter relative to the antenna of said receiver depending on the signal generated by the acceleration sensor and transmit the signal representative of the inflation pressure of the tire toward the antenna of said receiver when a transmitting request is issued and the determined position of said transmitter falls in a predetermined range.

2. The tire inflation pressure sensing apparatus as set forth in claim 1, wherein the acceleration sensor of said transmitter is arranged on the wheel of the vehicle such that the sensing direction of the acceleration sensor coincides with a radial direction of the wheel.

3. The tire inflation pressure sensing apparatus as set forth in claim 2, wherein said transmitter is configured to cancel a DC offset, which represents a centrifugal acceleration that is generated due to rotation of the wheel and acts on the acceleration sensor in the sensing direction thereof, from the signal generated by the acceleration sensor so as to determine the position of said transmitter depending on the resultant AC signal that represents only the component of gravitational acceleration in the sensing direction of the acceleration sensor.

4. The tire inflation pressure sensing apparatus as set forth in claim 1, wherein the acceleration sensor of said transmitter is arranged on the wheel of the vehicle such that the sensing direction of the acceleration sensor coincides with a circumferential direction of the wheel.

5. The tire inflation pressure sensing apparatus as set forth in claim 1, wherein said transmitter is configured to store the signal representative of the inflation pressure of the tire in a frame that consists of a plurality of packets and transmit those packets separately toward the antenna of said receiver at different times when the determined position of said transmitter falls in the predetermined range.

6. The tire inflation pressure sensing apparatus as set forth in claim 1, wherein said transmitter is supplied with electrical power through a radio wave transmitted from an electrical power charging antenna provided on the body of the vehicle.

7. The tire inflation pressure sensing apparatus as set forth in claim 6, wherein the antenna of said receiver and the electrical power charging antenna are configured with a single antenna through which both functions of supplying electrical power to said transmitter and transmitting the signal representative of the inflation pressure of the tire from said transmitter to said receiver are implemented.

8. A tire inflation pressure sensing apparatus comprising:
    a plurality of transmitters each of which is provided on one of a plurality of wheels of a vehicle, said transmitters each including a pressure sensor that works to sense an inflation pressure of a tire mounted on a corresponding one of the wheels and being configured to transmit a signal representative of the inflation pressure of the tire sensed by the pressure sensor; and
    a receiver provided on a body of the vehicle, said receiver including a single antenna and being configured to receive the signals transmitted from said transmitters through the antenna and determine inflation pressures of the tires depending on the received signals,
    wherein each of said transmitters further includes an acceleration sensor that works to generate a signal as a function of a component of gravitational acceleration in a sensing direction of the acceleration sensor, the component of gravitational acceleration varying with rotation of the corresponding one of the wheels, and wherein each of said transmitters is configured to determine a position thereof relative to the antenna of said receiver depending on the signal generated by the acceleration sensor and transmit the signal representative of the inflation pressure of the tire toward the antenna of said receiver when a transmitting request is issued and the determined position thereof falls in a predetermined range.

9. The tire inflation pressure sensing apparatus as set forth in claim 8, wherein the acceleration sensor of each of said transmitters is arranged on the corresponding one of the wheels of the vehicle such that the sensing direction of the acceleration sensor coincides with a radial direction of the corresponding wheel.

10. The tire inflation pressure sensing apparatus as set forth in claim 9, wherein each of said transmitters is configured to cancel a DC offset, which represents a centrifugal acceleration that is generated due to rotation of the corresponding wheel and acts on the acceleration sensor in the sensing direction thereof, from the signal generated by the acceleration sensor so as to determine the position thereof depending on the resultant AC signal that represents only the component of gravitational acceleration in the sensing direction of the acceleration sensor.

11. The tire inflation pressure sensing apparatus as set forth in claim 8, wherein the acceleration sensor of each of said transmitters is arranged on the corresponding one of the wheels of the vehicle such that the sensing direction of the acceleration sensor coincides with a circumferential direction of the corresponding wheel.

12. The tire inflation pressure sensing apparatus as set forth in claim 8, wherein each of said transmitters is configured to store the signal representative of the inflation pressure of the tire in a frame that consists of a plurality of packets and transmit those packets separately toward the antenna of said receiver at different times when the determined position thereof falls in the predetermined range.

13. The tire inflation pressure sensing apparatus as set forth in claim 8, wherein each of said transmitters is supplied with electrical power through a radio wave transmitted from one of a plurality of electrical power charging antennas provided on the body of the vehicle.

14. The tire inflation pressure sensing apparatus as set forth in claim 13, wherein the antenna of said receiver and all the electrical power charging antennas are configured with a single antenna through which both functions of supplying electrical power to said transmitters and transmitting the signals representative of the inflation pressures of the tires from said transmitters to said receiver are implemented.

* * * * *